(12) United States Patent
Kaminski et al.

(10) Patent No.: US 10,616,957 B2
(45) Date of Patent: Apr. 7, 2020

(54) HEAT GENERATING SYSTEM FOR A MOTOR VEHICLE

(71) Applicant: FORD GLOBAL TECHNOLOGIES, LLC, Dearborn, MI (US)

(72) Inventors: David Paul Kaminski, Redwood City, CA (US); Dragos Maciuca, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 578 days.

(21) Appl. No.: 15/440,309

(22) Filed: Feb. 23, 2017

(65) Prior Publication Data

US 2018/0242400 A1 Aug. 23, 2018

(51) Int. Cl.
*H05B 3/14* (2006.01)
*B60H 1/22* (2006.01)
(Continued)

(52) U.S. Cl.
CPC ............ *H05B 3/145* (2013.01); *B60H 1/2218* (2013.01); *B60H 1/2226* (2019.05); *B60H 1/2227* (2019.05); *E01H 5/106* (2013.01); *H05B 3/34* (2013.01); *B60H 2001/2234* (2013.01); *B60H 2001/2243* (2013.01); *B60H 2001/2293* (2013.01); *H05B 2203/032* (2013.01); *H05B 2214/02* (2013.01); *H05B 2214/04* (2013.01)

(58) Field of Classification Search
CPC .............. H05B 3/145; H05B 2203/032; H05B 2214/02; H05B 2214/04; H05B 1/0236; H05B 2203/013; H05B 1/00; H05B 3/84; H05B 2203/007; B60H 1/2218; E01H 5/106; B60S 1/026; B60S 1/68; B60S 1/023; B60S 1/04; B60S 1/0477; B82Y 30/00; B60J 5/04; C09D 5/24
USPC ........ 392/407, 437; 219/202, 203, 522, 528, 219/219, 539; 432/9; 977/734, 742; 237/12.4
See application file for complete search history.

(56) References Cited

U.S. PATENT DOCUMENTS 4,964,668 A 10/1990 Hofmann
5,385,774 A 1/1995 Cramer et al.
(Continued)

FOREIGN PATENT DOCUMENTS

DE 19611104 A1 9/1997
DE 102011116815 A1 4/2013
(Continued)

OTHER PUBLICATIONS

Office Action dated Dec. 10, 2018 for U.S. Appl. No. 15/584,434, filed May 2, 2017.
(Continued)

*Primary Examiner* — Dana Ross
*Assistant Examiner* — Joseph M Baillargeon
(74) *Attorney, Agent, or Firm* — David Coppiellie; Price Heneveld LLP

(57) ABSTRACT

A heat generating system for a motor vehicle includes a carbon nanotube heating element and a controller. The controller is configured to activate the carbon nanotube heating element in response to a wireless activation signal received from a remote communication device. A related method of heating a passenger compartment of a motor vehicle is also disclosed.

9 Claims, 5 Drawing Sheets

(51) Int. Cl.
*E01H 5/10* (2006.01)
*H05B 3/34* (2006.01)

(56) References Cited

U.S. PATENT DOCUMENTS

| | | | |
|---|---|---|---|
| 6,073,998 A | 6/2000 | Siarkowski et al. | |
| 6,140,609 A * | 10/2000 | Jones | B60R 3/002 |
| | | | 219/202 |
| 7,693,630 B1 * | 4/2010 | Mitchell | H05B 3/20 |
| | | | 219/202 |
| 9,308,870 B2 * | 4/2016 | Yang | B60R 3/02 |
| 9,873,308 B2 * | 1/2018 | Moench | B60H 1/00742 |
| 2002/0096572 A1 | 7/2002 | Chene et al. | |
| 2004/0189042 A1 | 9/2004 | Jarrard et al. | |
| 2008/0246301 A1 | 10/2008 | Gustavsson et al. | |
| 2011/0204037 A1 * | 8/2011 | Seaborn | H05B 3/84 |
| | | | 219/203 |
| 2012/0082806 A1 * | 4/2012 | Kissell | C09D 5/24 |
| | | | 428/34.1 |
| 2013/0125853 A1 * | 5/2013 | Pursifull | F01M 5/001 |
| | | | 123/196 AB |
| 2014/0217079 A1 | 8/2014 | Nelson et al. | |
| 2014/0232147 A1 | 8/2014 | Held | |
| 2016/0007474 A1 | 1/2016 | Dardona et al. | |
| 2016/0144690 A1 | 5/2016 | Wittkowski et al. | |
| 2016/0144714 A1 | 5/2016 | Kim | |
| 2018/0002024 A1 | 1/2018 | Brelati et al. | |
| 2018/0168002 A1 | 6/2018 | Slane et al. | |

FOREIGN PATENT DOCUMENTS

| | | |
|---|---|---|
| JP | H07279138 A | 10/1995 |
| KR | 20110128702 A | 11/2011 |
| KR | 20130030330 A | 3/2013 |

OTHER PUBLICATIONS

English Machine Translation of DE102011116815A1.
English Machine Translation of KR20110128702A.
English Machine Translation of JPH07279138A.
English Machine Translation of DE19611104A1.
English Machine Translation of KR20130030330A.

* cited by examiner

HEAT GENERATING SYSTEM FOR A MOTOR VEHICLE

TECHNICAL FIELD

This document relates generally to the motor vehicle equipment field and, more particularly, to a heat generating system for a motor vehicle that may be utilized, for example, to heat the windshield, the passenger compartment or even the ground to melt ice and snow adjacent the side of a motor vehicle in response to a remote wireless activation signal.

BACKGROUND

During winter in many locations around the world, the temperature may fall to uncomfortably low levels. The windshield and ground near the doors of the motor vehicle may be covered in ice and snow. An individual approaching or standing near the motor vehicle might slip due to the winter weather conditions.

This document relates to a new and improved heat generating system for a motor vehicle that may be utilized for a number of purposes including, for example, heating the windshield of the motor vehicle, heating the passenger compartment or even heating the ground of the motor vehicle adjacent the motor vehicle doors in order to melt ice and snow in order to improve the footing adjacent the motor vehicle when opening the door of the motor vehicle.

SUMMARY

In accordance with the purposes and benefits described herein, a heat generating system is provided for a motor vehicle. That heat generating system comprises a carbon nanotube heating element and a controller configured to activate the carbon nanotube heating element in response to a wireless activation signal received from a remote communication device.

The carbon nanotube heating element may be carried on the motor vehicle adjacent a rocker panel and oriented to direct infrared radiation (IR-radiation) upon an area of the ground adjacent a door of the motor vehicle in order to melt ice and snow.

The carbon nanotube heating element may be carried on a dashboard of the motor vehicle and oriented to direct IR-radiation upon an area of a windshield of the motor vehicle so as to heat that area of the windshield. This allows for defogging of the windshield and/or the melting of ice and snow.

The carbon nanotube heating element may be carried on an interior of the roof of the motor vehicle and oriented to direct IR-radiation downward toward the seats of the motor vehicle.

The remote communication device may be a key fob, a cell phone or any other appropriate wireless communication device capable of communicating with a controller of the motor vehicle.

In accordance with an additional aspect, a heat generating system is provided for a motor vehicle. That heat generating system comprises a heating element carried on the motor vehicle adjacent a rocker panel. The heating element is oriented to direct IR-radiation upon an area of the ground adjacent a door of the motor vehicle to melt ice and snow.

The heat generating system may further include a controller configured to control operation of the heat generating element. Further, the heat generating system may include a remote communication device. That remote communication device provides a wireless activation signal to the controller. In such a situation a controller is configured to activate the heating element in response to the wireless activation signal.

Still further, the heating element may comprise a carbon nanotube heating element. In addition, the heat generating system may further include an actuator. That actuator functions to displace the heating element between a stowed position and a deployed position. The actuator may be controlled by the controller.

In accordance with still another aspect, a method is provided for heating a passenger compartment of a motor vehicle. That method comprises the steps of locating a heating element on an underside of a roof of a motor vehicle and directing heat from the heating element downward into the passenger compartment.

The method may further include the step of using a carbon nanotube heating element for generating IR-radiation. Further, the method may include controlling operation of the heating element by a controller.

In addition, the method may include configuring the controller to activate the heating element in response to a wireless activation signal received from a remote communication device. Further, the method may include locating a second heating element on a dashboard and directing heat from the second heating element upward onto a windshield of the motor vehicle. In addition, the method may include the step of configuring the controller to activate the second heating element in response to a second activation signal received from the remote communication device.

Still further, the method may include the step of locating a third heating element adjacent a rocker panel and directing heat from the third heating element upon an area of ground adjacent a door of the motor vehicle in order to melt ice and snow. In addition, the method may include configuring the controller to activate the third heating element in response to a third activation signal received from the remote communication device.

Still further, the method may include the step of using a key fob paired to the motor vehicle as the remote communication device. In other of the many possible embodiments, the method may include using a cell phone paired by an app to the motor vehicle as the remote communication device.

In the following description, there are shown and described several preferred embodiments of the heat generating system as well as the related method of heating a passenger compartment of a motor vehicle and/or heating the ground adjacent a door of the motor vehicle in order to melt ice and snow. As it should be realized, the heat generating system and related methods are capable of other, different embodiments and their several details are capable of modification in various, obvious aspects all without departing from the heat generating system and methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the heat generating system and related methods and together with the description serve to explain certain principles thereof.

Reference will now be made in detail to the present preferred embodiments of the heat generating system, examples of which are illustrated in the accompanying drawing figures.

DETAILED DESCRIPTION

Figure 1:
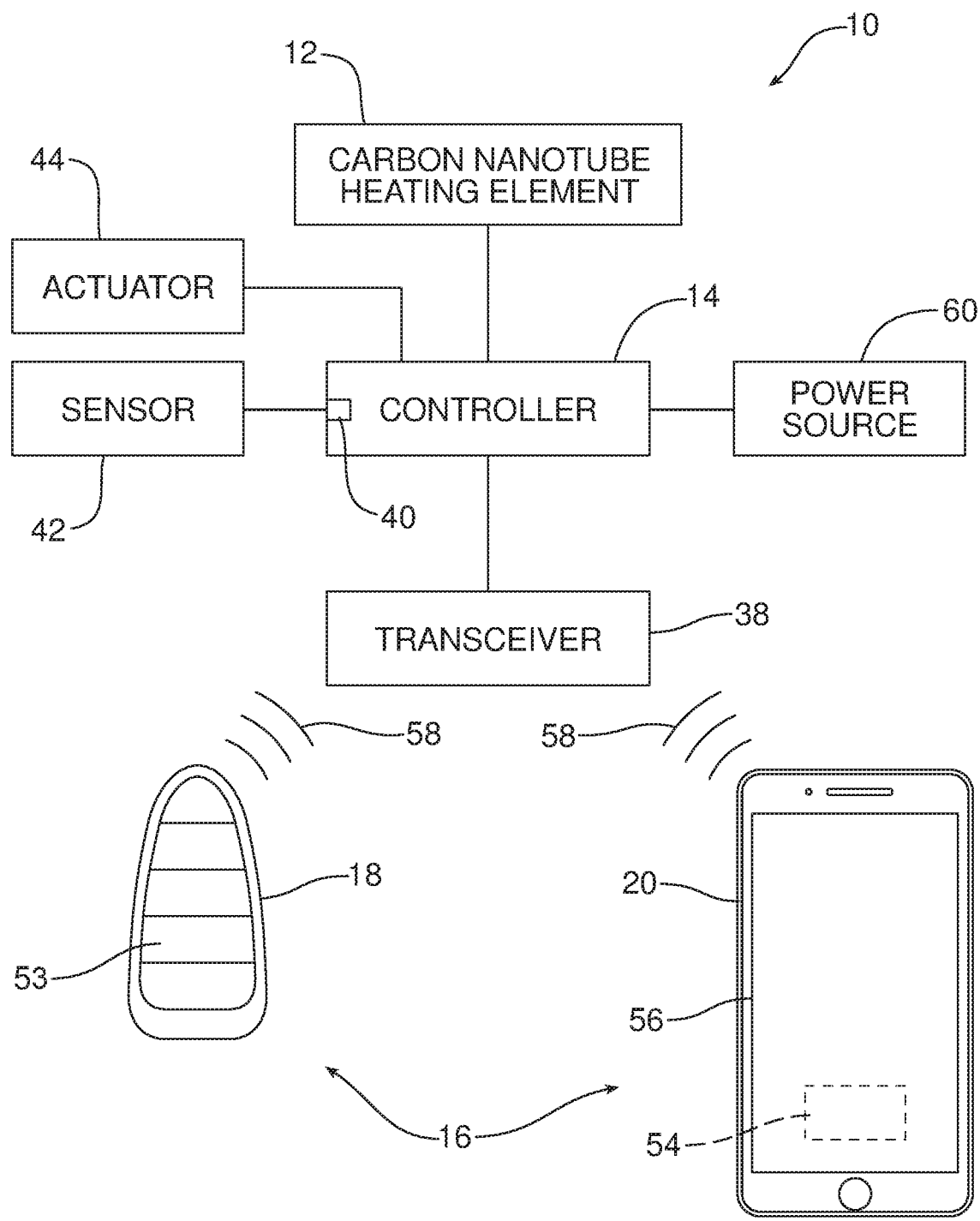
FIG. 1 is a schematic block diagram of the heat generating system.

Reference is now made to FIG. 1 which schematically illustrates the new and improved heat generating system 10. That heat generating system 10 includes a heating element 12 such as a carbon nanotube heating element of a type known in the art. Such a heating element 12 may take a number of forms including a carbon nanotube sheet or a carbon nanotube coating provided on an appropriate substrate.

As further illustrated in FIG. 1, the heat generating system 10 includes a controller 14. The controller 14 is configured to activate the heating element 12 in response to a wireless activation signal received from a remote communication device 16 such as the key fob 18 or the cell phone 20.

Figure 1A:
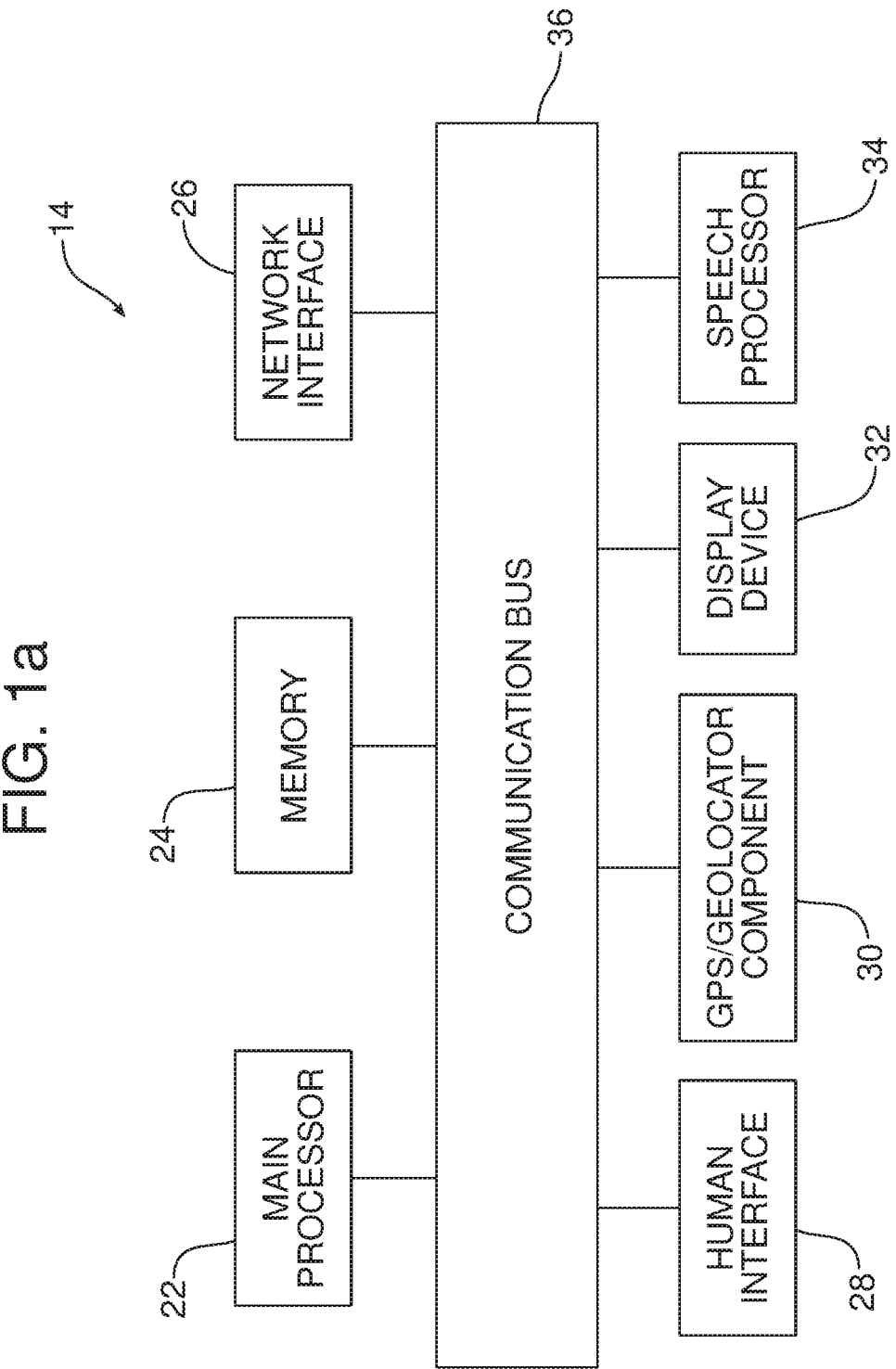
FIG. 1a is a schematic block diagram of one possible embodiment of a controller for the heat generating system.

More specifically, the controller 14 may comprise a computing device such as a dedicated microprocessor or electronic control unit (ECU) operating in accordance with instructions from appropriate control software. As illustrated in FIG. 1a, the controller 14 comprises a body control module (BCM) including one or more processors 22, one or more memories 24, one or more network interfaces 26, a human interface 28, a GPS/geolocator component 30, a display device such as a multi-function display with touchscreen capability 32, and a speech processor 34, having voice command capability, that all communicate with each other over a communication bus 36. Such a BCM controller 14 may perform a number of interior body electrically based functions including, for example, interior locking, remote key entry, interior lighting, exterior lighting, windshield wiper control and the like. In some embodiments a BCM controller 14 of this type may also function to control entertainment functions (e.g. radio, CD player) and communications such as telephone and internet communications over a wireless network. In some embodiments a BCM controller 14 is connected by a communication bus (not shown) to other control modules that provide one or more of these additional functions.

As illustrated in FIG. 1, the controller 14 is connected to a transceiver 38 adapted for wireless communication with the remote control device 16 such as the key fob 18 and cell phone 20. As should be appreciated and as is known in the art, such a key fob 18 includes built-in authentication to allow authorized access and communication with the controller 14 of a matched motor vehicle. Such a cell phone 20 may run an app providing a similar built-in authentication for the same purpose.

As further illustrated in FIG. 1, the controller 14 may include a data input 40 connected to an appropriate sensor 42 such as a heating element temperature sensor, an ambient temperature sensor or any other appropriate sensor or monitoring device capable of providing data of interest to the controller for operating the heating element 12.

As also illustrated in FIG. 1, the controller 14 may be connected to and configured to control an actuator 44 capable of displacing the heating element 12 between a stowed position and a deployed position in a manner that will be described in greater detail below. Such an actuator 44 may comprise a hydraulic actuator, a pneumatic actuator, a mechanically driven linkage or any other type of actuator capable of displacing the heating element 12 in the desired manner.

Figure 2:
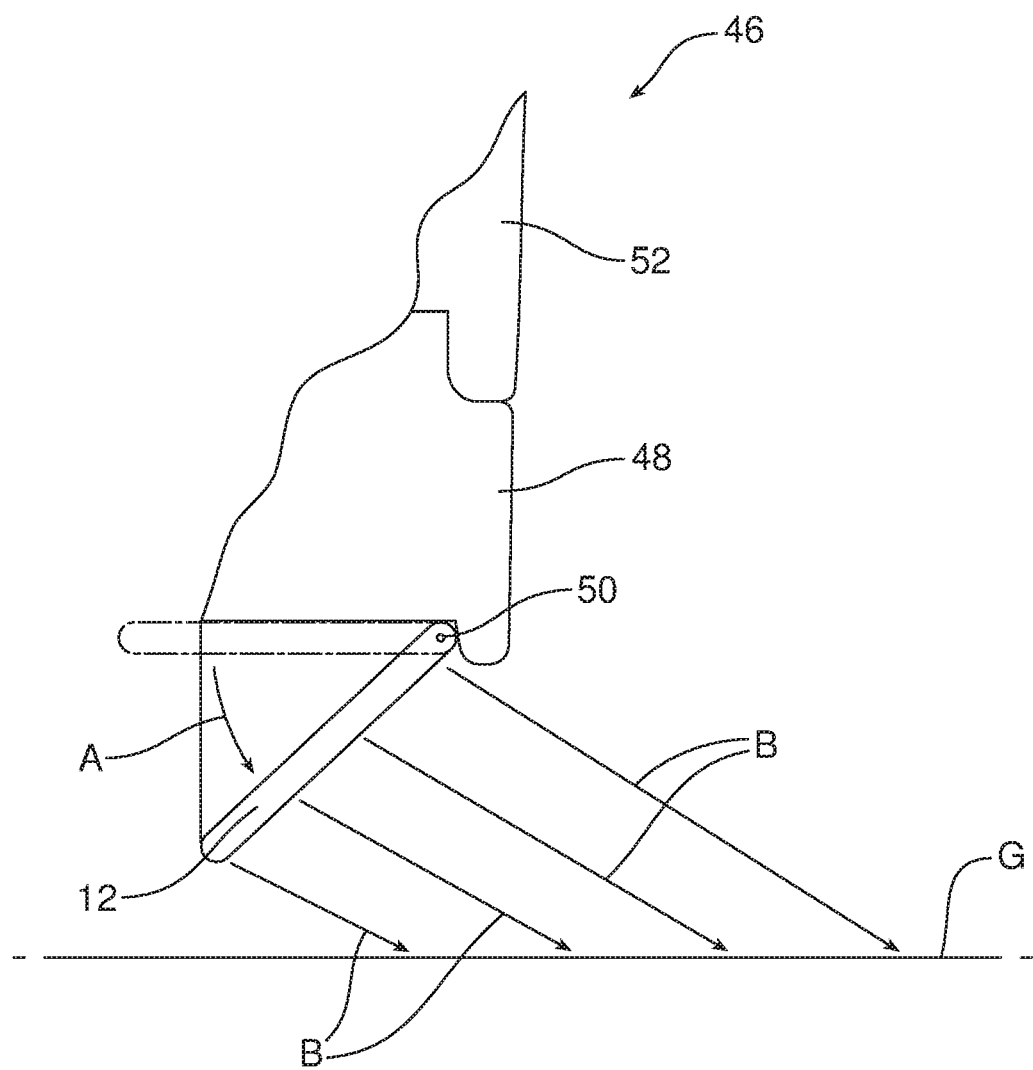
FIG. 2 is an illustration of one possible embodiment of the heat generating system wherein a heating element of that system is utilized to heat the ground adjacent a door of the motor vehicle in order to melt ice and snow and improve the footing for individuals seeking to enter the motor vehicle.

In the embodiment illustrated in FIG. 2, the heating element 12 is carried on the motor vehicle 46 adjacent a rocker panel 48. In the illustrated embodiment, the heating element 12 is connected by means of a hinge 50 to the frame or rocker panel 48 of the motor vehicle 46. The actuator 44 (see also FIG. 1) pivots (note action arrow A) the heating element 12 between a stowed position (illustrated in phantom line), wherein the heating element is folded up under the rocker panel 48 in a protected position, and a deployed position (illustrated in full line) wherein the heating element is oriented to direct IR-radiation upon an area of the ground G adjacent a door 52 of the motor vehicle in order to melt ice and snow. Note action arrows B illustrating the path of the generated IR-radiation.

Thus, an operator of the motor vehicle 46 may depress, for example, a dedicated button 53 on a key fob 18 or display screen button 54 on the display screen 56 of the cell phone 20 in order to send a wireless activation signal 58 that is received by the transceiver 38 and directed to the controller 14. Following authentication, the controller 14 responds to the wireless activation signal 58 received from the remote communication device 16 by routing power from the power source 60 of the motor vehicle to activate the heating element 12 and melt ice and snow on the ground G adjacent the door 52 of the motor vehicle. This provides the operator of the motor vehicle 46 with better footing when reaching the motor vehicle 46 and opening the door 52.

Figure 3:
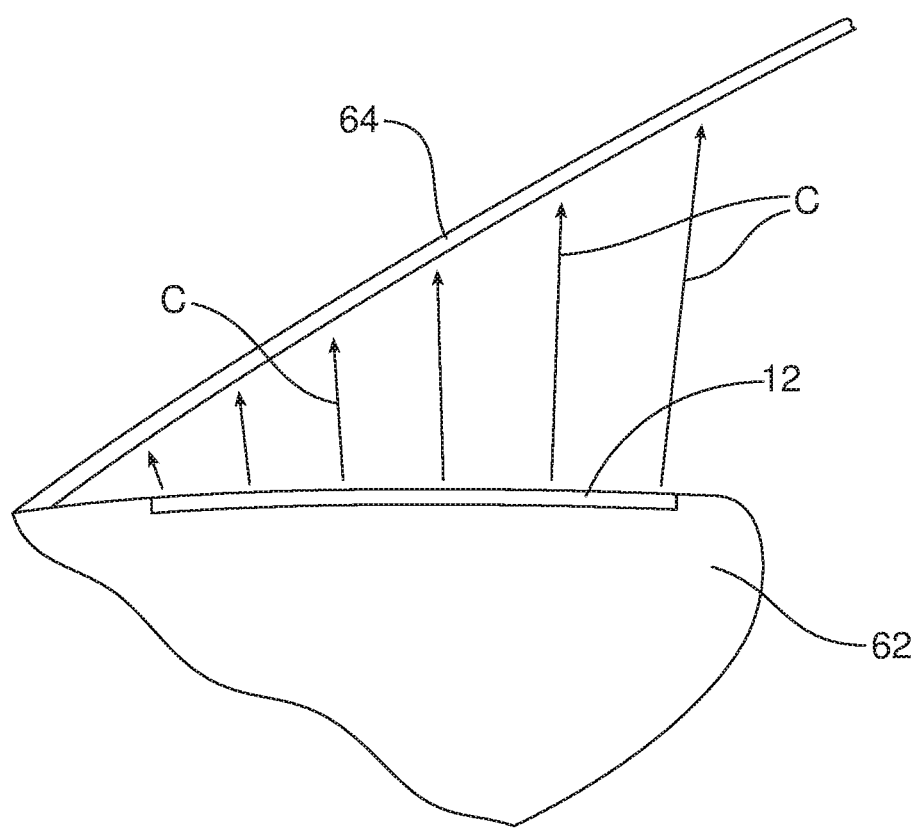
FIG. 3 is an illustration of yet another possible embodiment of the heat generating system wherein the heating element is provided on a dashboard to heat the windshield of the motor vehicle.

As illustrated in FIG. 3, the heating element 12 is provided in the upper surface of the dashboard 62. In such an embodiment, when a wireless activation signal is received from the remote communication device 16, the controller 14 activates the heating element 12 which is oriented to direct IR-radiation upon an area of the windshield 64 (note action arrow C) to heat that area of the windshield, defogging the windshield and/or melting ice and snow.

Figure 4:
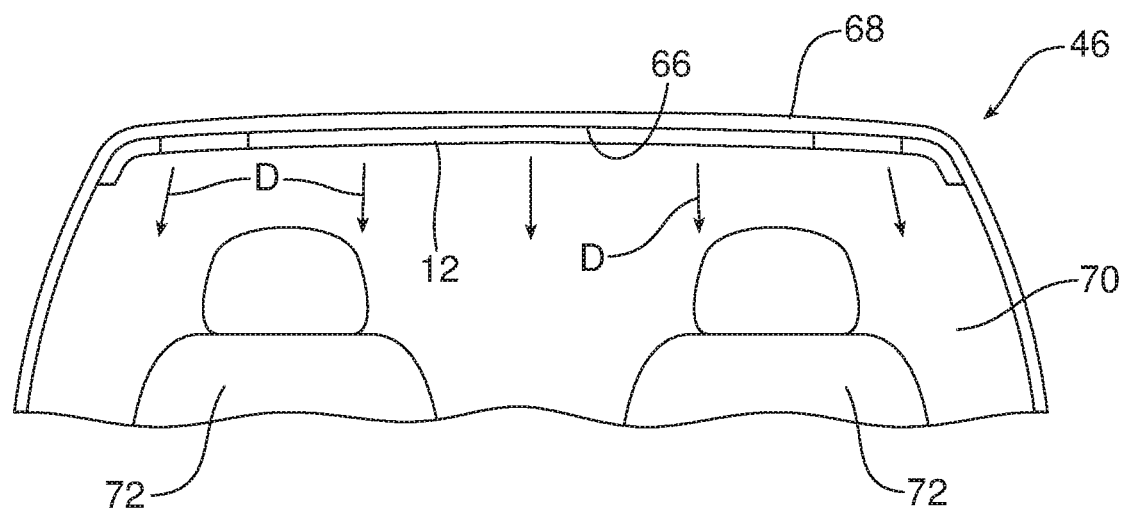
FIG. 4 is an illustration of still another possible embodiment of the heat generating system wherein the heating element of the heat generating system is provided along an interior surface of the roof of the motor vehicle in order to heat the passenger compartment of the motor vehicle including the seat backs and seat faces as well as any individuals that may be sitting in the motor vehicle.

As illustrated in FIG. 4, the heating element 12 is mounted to the underside 66 of the roof 68 of the motor vehicle 46. In this embodiment, the controller 14 is configured to activate the heating element 12 in response to the wireless activation signal received from the remote communication device 16. When activated, the heating element directs IR-radiation downward into the passenger compartment 70 of the motor vehicle (note action arrows D) toward the seats 72 and any individuals sitting therein. IR-radiation from above provides a unique warming effect greatly enhancing the comfort of any individual sitting in the seats 72 in cold weather conditions.

Consistent with the above description, a method is provided of heating a passenger compartment 70 of a motor vehicle 46. That method comprises locating a heating element 12 on an underside 66 of the roof 68 of the motor vehicle and directing heat, in the form of IR-radiation, from the heating element downward into the passenger compartment.

Toward that end, the method may include using a carbon nanotube heating element 12 for generating IR-radiation and controlling operation of the heating element by means of a controller 14. Further, the method may include configuring that controller 14 to activate the heating element 12 in response to a wireless activation signal 58 received from a remote communication device 16 such as the key fob 18 or cell phone 20.

The method may also include locating a second heating element 12 on a dashboard 62 and directing heat from that second heating element upward onto the windshield 64 of the motor vehicle 46. In such an embodiment the method may include configuring the controller 14 to activate the second heating element 12 on the dashboard 62 in response to a second activation signal 58 from the remote communication device 16.

Still further, the method may include locating a third heating element 12 adjacent a rocker panel 48 and directing heat from that third heating element upon an area of the ground G adjacent a door 52 of the motor vehicle 46 in order to melt ice and snow. In such an embodiment, the method may include configuring the controller 14 to activate the third heating element 12 adjacent the rocker panel 48 in response to a third activation signal 58 received from the remote communication device 16. Here again it should be noted that the method may include using a key fob 18 with built in authentication or a cell phone 20 paired by an app to the motor vehicle 46 as the remote communication device 16.

In accordance with still another aspect, the method may comprise a method of heating an area of the ground G adjacent a door 52 of the motor vehicle 46. Such a method comprises locating a heating element 12 adjacent a rocker panel 48 of the motor vehicle 46 and directing heat from the heating element upon the area of the ground G adjacent the door 52 in order to melt the ice and snow.

Numerous benefits and advantages are provided by the heat generating system 10. The heat generating system 10 is particularly useful when used in conjunction with the remote start feature for a motor vehicle 46 allowing (a) the melting of ice and snow from the windshield 64 so as to provide clear visibility and allow one to drive immediately upon entering the vehicle or (b) the melting of ice and snow on the ground G adjacent the door 52 of the motor vehicle so as to allow one to have better footing and easier access to the motor vehicle when reaching the door. Further, the heat generating system 10 may allow one to preheat the passenger compartment 70 of the motor vehicle before entering the motor vehicle. This increases operator comfort. In addition, the overhead heating element 12 provides a warm radiant heat from above that is particularly comfortable and makes an individual feel warmer on a cold winter day and particularly as the passenger compartment is first being warmed.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A heat generating system for motor vehicle, comprising: a first carbon nanotube heating element disposed vehicle inward of a rocker panel and a bottom surface of the first carbon nanotube heating element configured to be angled outward to direct IR-radiation upon an area of ground adjacent a door of said motor vehicle;
    a controller configured to activate said first carbon nanotube heating element in response to a wireless activation signal received from a remote communication device and
    an actuator to displace said heating element between a stowed position and a deployed position wherein the heating element is disposed vehicle inward of the rocker panel in each of the stowed position and the deployed position.

2. The heat generating system of claim 1, further comprising a second carbon nanotube heating element carried on a dashboard and oriented to direct IR-radiation upon an area of a windshield so as to heat said area of said windshield.

3. The heat generating system of claim 2, further comprising a third carbon nanotube heating element carried on an interior of a roof of said motor vehicle and oriented to direct IR-radiation downward toward seats of said motor vehicle.

4. The heat generating system of claim 1, wherein said remote communication device is a key fob.

5. A heat generating system for a motor vehicle, comprising:
    a heating element carried on said motor vehicle adjacent a rocker panel and oriented to direct heat upon an area of ground adjacent a door of said motor vehicle to melt ice and snow; and
    an actuator to displace said heating element between a stowed position and a deployed position wherein the heating element is disposed vehicle inward of the rocker panel in each of the stowed position and the deployed position.

6. The heat generating system of claim 5, further including a controller configured to control operation of said heat generating element.

7. The heat generating system of claim 6, further including a remote communication device providing a wireless activation signal to said controller, said controller being configured to activate said heating element in response to said wireless activation signal.

8. The heat generating system of claim 7, wherein said heating element is a carbon nanotube heating element for generating IR-radiation.

9. The heat generating system of claim 8, wherein said actuator is configured to be controlled by said controller.

* * * * *